Nov. 22, 1949
E. G. ULRICH
2,488,749
TRUCK ANCHOR
Filed Sept. 27, 1945
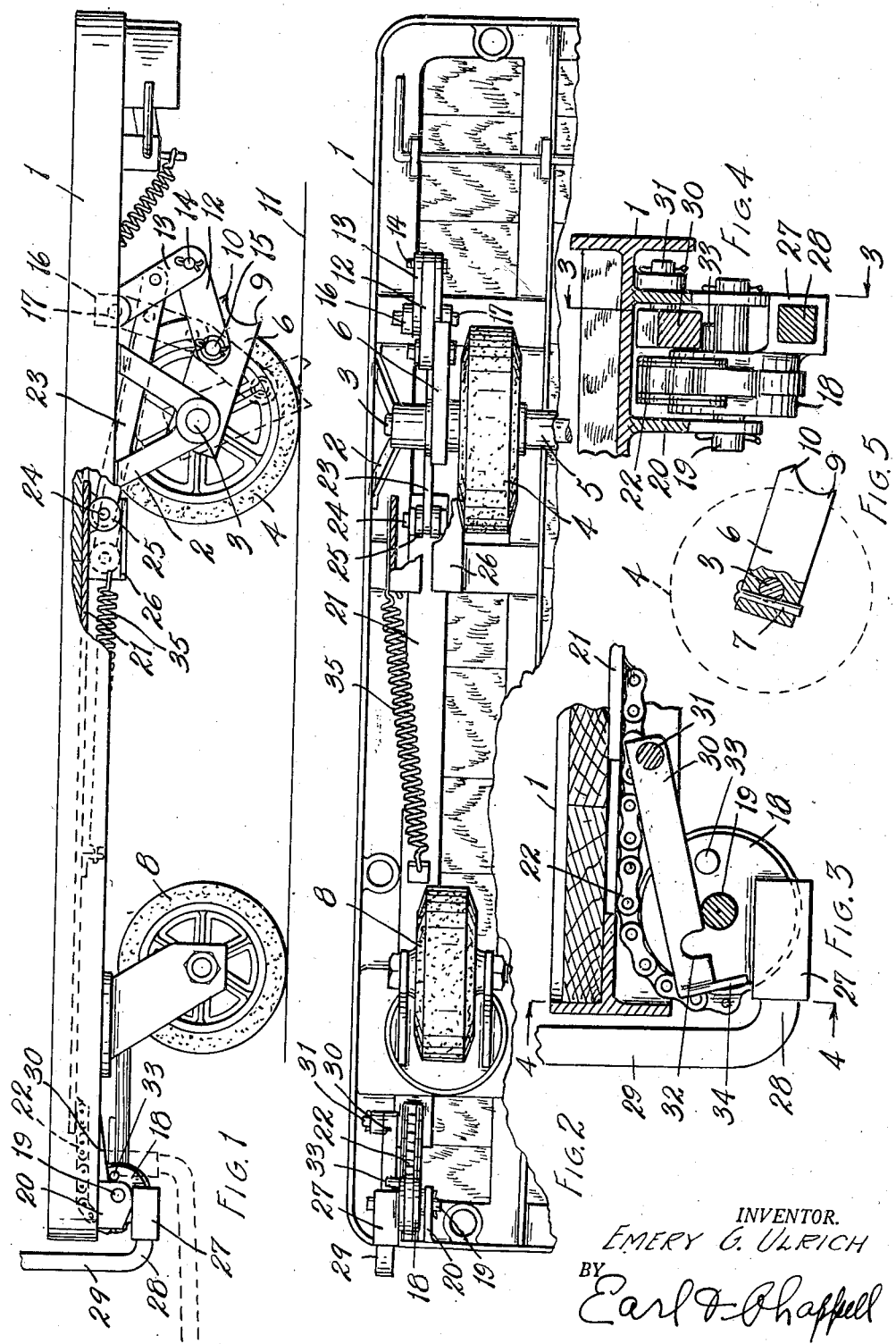
INVENTOR.
EMERY G. ULRICH
BY Earl D. Chappell
ATTORNEYS.

Patented Nov. 22, 1949

2,488,749

UNITED STATES PATENT OFFICE 2,488,749

TRUCK ANCHOR

Emery G. Ulrich, Toledo, Ohio; Vivian R. Ulrich, administratrix of said Emery G. Ulrich, deceased, assignor to Vivian R. Ulrich Application September 27, 1945, Serial No. 618,963

5 Claims. (Cl. 188—5)

1

This invention relates to improvements in truck anchor.

The main objects of this invention are:

First, to provide a freight and warehouse truck with an effective anchor and one which may be used in the handling of freight and merchandise in freight houses, warehouses and factories, and used in the shipment of freight in freight cars without the necessity of unloading the trucks, the trucks being firmly anchored in the freight cars.

Second, to provide a structure having these advantages which is simple and economical in its parts and in which the anchoring means is easily actuated to engaging position and easily released.

Objects relating to details and economies of the invention will appear from the description to follow. The invention is defined in the claims.

A structure which embodies the features of the invention is clearly illustrated in the accompanying drawing in which:

Fig. 1 is a side elevation of a truck embodying the features of my invention, parts being broken away and in section to show structural details. The hangers are illustrated in retracted position by full lines and in actuated position by dotted lines.

Fig. 2 is an inverted fragmentary view.

Fig. 3 is an enlarged fragmentary view in section on line 3—3 of Fig. 4.

Fig. 4 is a fragmentary view in section on line 4—4 of Fig. 3.

Fig. 5 is a fragmentary view partially in section illustrating the relation of the anchor members to the axle, one of the wheels being indicated by dotted lines.

In the embodiment illustrated in the accompanying drawing the body 1 of the truck is shown more or less conventionally. Hangers 2 carry the axle 3 for the pair of carrying wheels 4. These wheels however are mounted on the sleeve 5, the end of which is spaced from the ends of the axle so that the bar-like anchor members 6 may be mounted on the axle between the ends of the sleeve and the hangers. The anchor members are secured to the axle by means of the pins or keys 7 (see Fig. 5). The axle is rockably mounted in its hangers. The truck is provided with a pair of caster wheels 8, only one of which is illustrated.

The anchor members are of a length exceeding the radius of the wheels and in the preferred embodiment of the invention are provided with front and rear teeth 9 and 10 of different length, the rear teeth being longer than the front teeth so that the teeth are presented in approximately the same horizontal plane for engagement with

2 the floor or platform 11 when the anchor is in an inclined actuated position as shown by dotted lines in Fig. 1.

The anchor members are actuated by a toggle comprising the toggle links 12 and 13 pivotally connected to each other at 14, the link 12 being connected to one of the anchor members at 15 and the link 13 pivotally connected to the bracket 16 on the truck body at 17. Both anchor members are fixed to the axle so they are simultaneously actuated by the actuation of the single toggle. The actuating means comprises the drum 18 rotatably mounted at 19 on a hanger 20 disposed at one end of the truck, preferably the forward end. This drum is connected to the actuating slide link 21 by means of the flexible element 22, a section of sprocket chain being employed in the embodiment illustrated. This flexible element is secured to the drum to wind thereon when the drum is actuated. The coupling link is slidably mounted on the under side of the body and is connected to the toggle member 13 by means of the coupling link 23. The connecting pivot 24 is provided with rollers 25 traveling in the way 26 secured to the under side of the body.

The drum is provided with a socket 27 adapted to receive the angled end 28 of the operating crank or lever 29, the socket facing outwardly when the parts are in retracted position, see Fig. 3. The actuated position is indicated by dotted lines in Fig. 1. Spring 35 holds the anchor in retracted position.

The holding dog 30 is pivoted at 31 and provided with a downwardly facing notch 32 adapted to engage the pin-like keeper 33 when the drum is in actuated anchor engaging position. This engagement is automatic. The dog is provided with a downwardly projecting nose portion 34 which may be engaged by a tool for releasing the dog or serve as a grip. As stated, the length of the anchors, particularly in regard to the teeth thereof, exceeds the radius of the wheels, and when actuated they tend to lift the wheels from the floor, deck or platform; but it is contemplated that under ordinary conditions the weight of the load will embed the teeth of the anchor members, thus anchoring the truck. However, it is not contemplated that under ordinary circumstances the anchors shall sustain the full load.

I have illustrated and described my invention in an embodiment which I find highly practical and, as stated, this embodiment is particularly designed for trucks used in handling freight for shipment in freight cars without unloading the trucks; that is, the trucks are run into the freight cars and anchored therein. It will be appreciated that in such circumstances very secure anchoring is required, and I have accomplished this by this invention. It should be understood, however, that I contemplate the embodiment of the invention in trucks designed for various purposes where anchoring is a feature to be desired. I have not attempted to illustrate or describe the various adaptations which I contemplate as it is believed this disclosure will enable those skilled in the art to embody the invention as may be desired.

Having thus described my invention, what I claim as new and desire to secure by Letters Patent is:

1. The combination with a truck body provided with axle hangers, an axle rockably mounted on said hangers, a wheel supporting sleeve on said axle, wheels on said sleeve, anchor members fixed to said axle between the ends of said sleeve and the hangers, an actuating toggle comprising a pair of pivotally connected links, one of the links being pivotally connected to one of said anchor members and the other pivotally connected to the truck body, an actuating link disposed on the under side of said body, a coupling link pivotally connected to one of said toggle links and to the inner end of said actuating link, the pivot connecting said actuating link and coupling link being provided with a roller, said body being provided with a supporting way for said roller, an actuating drum mounted on said body at an end thereof and provided with a handle socket positioned to face toward an end of the truck when the drum is in its unactuated position, a flexible extension for said actuating link connected to said drum to wind thereon, a manually releasable holding dog for said drum, said drum being provided with a keeper with which said dog automatically engages when the drum is in its actuated position, an actuating lever angled at its inner end to engage said socket in said drum, and a retracting spring connected at one end to said body and at the other to said actuating link.

2. The combination with a truck body provided with axle hangers, an axle rockably mounted on said hangers, a wheel supporting sleeve on said axle, wheels on said sleeve, anchor members fixed to said axle between the ends of said sleeve and the hangers, an actuating toggle comprising a pair of pivotally connected links, one of the links being pivotally connected to one of said anchor members and the other pivotally connected to the truck body, an actuating link disposed on the under side of said body, a coupling link pivotally connected to one of said toggle links and to the inner end of said actuating link, an actuating drum mounted on said body at an end thereof, a flexible extension for said actuating link connected to said drum to wind thereon, a manually releasable holding dog for said drum, said drum being provided with a keeper with which said dog automatically engages when the drum is in its actuated position, and a retracting spring connected at one end to said body and at the other to said actuating link.

3. The combination with a truck body provided with axle hangers, an axle rockably mounted on said hangers, a wheel supporting sleeve on said axle, wheels on said sleeve, anchor members fixed to said axle between the ends of said sleeve and the hangers, said anchor members having spaced front and rear teeth, the rear teeth being longer than the front teeth whereby the teeth are presented in approximately the same horizontal plane when the anchors are in an inclined actuated position, an actuating toggle comprising a pair of pivotally connected links, one of the links being pivotally connected to one of said anchor members and the other pivotally connected to the truck body, an actuating link disposed on the under side of said body, a coupling link pivotally connected to one of said toggle links and to the inner end of said actuating link, an actuating drum mounted on said body at an end thereof, a flexible extension for said actuating link connected to said drum to wind thereon, a manually releasable holding dog for said drum, said drum being provided with a keeper with which said dog automatically engages when the drum is in its actuated position, and a retracting spring connected at one end to said body and at the other to said actuating link.

4. The combination with a truck body provided with axle hangers, wheels, an axle for said wheels rockably mounted on said hangers, anchor members fixed to said axle, said anchor members having spaced front and rear teeth, the rear teeth being longer than the front teeth whereby the teeth are presented in approximately the same horizontal plane when the anchors are in an inclined actuated position, an actuating toggle comprising a pair of pivotally connected links, one of the links being pivotally connected to one of said anchor members and the other pivotally connected to the truck body, a toggle actuating means including an actuating drum mounted at an end of the body, an actuating link slidably mounted on said body and having a flexible extension connected to said drum to wind thereon, a coupling link pivotally connected to said actuating link and to one of said toggle links, an automatically engaging manually releasable holding dog for holding said drum in its actuated position, and a retracting spring for said anchors.

5. The combination with a truck body provided with axle hangers, wheels, an axle for said wheels rockably mounted on said hangers, anchor members fixed to said axle, an actuating toggle comprising a pair of pivotally connected links, one of the links being pivotally connected to one of said anchor members and the other pivotally connected to the truck body, a toggle actuating means including an actuating drum mounted at an end of the body, an actuating link slidably mounted on said body and having a flexible extension connected to said drum to wind thereon, a coupling link pivotally connected to said actuating link and to one of said toggle links, an automatically engaging manually releasable holding dog for holding said drum in its actuated position, and a retracting spring for said anchors.

EMERY G. ULRICH.

REFERENCES CITED

The following references are of record in the file of this patent:

UNITED STATES PATENTS

| Number | Name | Date |
|---|---|---|
| 8,609 | King | Dec. 23, 1851 |
| 850,414 | Birdsall | Apr. 16, 1907 |
| 938,720 | Stables | Nov. 2, 1909 |
| 1,306,385 | McNamara | June 10, 1919 |
| 1,311,998 | Rogers | Aug. 5, 1919 |
| 1,419,366 | Fail | June 13, 1922 |
| 1,621,378 | Reeder | Mar. 15, 1927 |
| 1,753,588 | Baillie | Apr. 8, 1930 |